Patented Apr. 15, 1947

2,418,866

UNITED STATES PATENT OFFICE 2,418,866

PROCESS FOR PREPARING PECTINATES

Edwin F. Bryant, Corona, Calif., assignor to California Fruit Growers Exchange, Los Angeles, Calif., a corporation of California No Drawing. Original application April 12, 1943, Serial No. 482,827. Divided and this application September 4, 1945, Serial No. 614,427

4 Claims. (Cl. 260—209.5)

This invention is concerned with therapeutic compositions and similar preparations for use in the treatment of certain conditions wherein it may be desirable to introduce pectinous substances into the intestinal tract. More particularly, the invention relates to methods for the preparation of pectic materials which are suitable for oral administration.

The use of pectin for oral administration has been proposed heretofore but it involves difficulties which it is my object to overcome by the present invention.

Accordingly, an object of my invention is to disclose methods and means of preparing pectic materials which may be used in place of pectin for oral administration or other uses.

A further object of my invention is to disclose methods and means of preparing pectic materials useful for the treatment of colitis and other intestinal disorders.

The materials having useful properties for the above and analogous purposes which I have developed are those compositions which may be produced from pectin and are generally referred to as pectinates. Pectinates, as for example, calcium pectinate, have been known for some time. However, ordinarily the preparation of such material has arisen as a step in various processes for the preparation of water soluble pectin. U. S. Patent 2,132,577 discloses a process for the preparation of water soluble pectin in which, during one step of the process, calcium pectinate is produced. The calcium pectinate is subsequently treated to produce water soluble pectin. As distinguished from this and other processes, I have devised a new and novel method for preparing insoluble pectinates using soluble pectin as the starting material. Also I have devised means of preparing pectinates which are insoluble in water and which may have one or more metal ions in combination therewith.

As a specific example of the practice of one of the preferred forms of my invention, the product of which in this instance is a member of the above class and is itself properly designated as calcium sodium pectinate, I give the following:

Twenty kilograms of pectin having a methoxyl content of from 9 to 11% are suspended in 125 liters of 65% isopropyl alcohol; to this suspension are added 1 to 2 kilograms of sodium hydroxide in the form of a solid or of a concentrated solution. The mixture may be warmed if desired to hasten the reaction, although this is not necessary. The suspension is thoroughly stirred for a period of from 5 to 15 minutes and then there is added with continued stirring 1 to 3 kilograms of calcium chloride in the form of a solid or preferably dissolved in 65% isopropyl alcohol. Upon addition of the calcium chloride, the suspension is further agitated for a period of from 5 to 15 minutes, and the resulting sodium calcium pectinate filtered therefrom. The product is then washed with 65% isopropyl alcohol to remove soluble salts and extraneous materials, after which the pectinate is further washed with alcohol of higher percentage and subsequently dried. The resulting pectinate is substantially water insoluble.

It will be understood that in referring to a particular methoxyl content of pectin, reference is made to the percentage of —$OCH_3$, determinable by accepted analytical procedures. The true pectin molecule has a number of —COOH or carboxyl groups. Varying proportions of these groups may occur in what is commonly called methoxylated form as —$COOCH_3$ groups. It is to be understood that when I treat the pectin with an alkaline substance, as for example the sodium hydroxide above indicated, the normal replacement of hydrogen ions by cations of the treating reagents will occur on the carboxyl groups. Furthermore, methoxyl groups will be removed to a certain extent from the pectin molecule to provide additional carboxyl groups which are not methoxylated. It is to be noted that I desire in treating the pectin with an alkaline substance to retain a certain percentage or proportion of the methoxyl groups undisturbed. The whole reaction is therefore sharply differentiated from the alkaline hydrolysis of pectins in which all the methoxyl groups are removed and the molecular structure itself probably caused to undergo a certain amount of depolymerization. That is to say, by my process the essential characteristics of the molecular structure of pectin are maintained. I find this desirable since the characteristics of the pectin molecule are eventually utilized, subsequent to oral administration for the uses above mentioned.

In the first step of my process, that is the treatment of pectin with an alkali in the presence of a medium which does not hydrate the pectin to any substantial degree, the pectinate—in the above example, sodium pectinate—so prepared is water soluble although alcohol insoluble. By combining with the sodium pectinate adequate amounts of calcium in the second step of my process, a sodium calcium pectinate is produced which itself is not only alcohol insoluble but water insoluble. The solubility of the sodium calcium pectinate depends upon the amount of calcium introduced into the molecule. That is to say, adequate calcium must be introduced into the complex to insure its insolubility. For oral adminstration, I have found that a very suitable compound having the desired water insolubility may be prepared as above disclosed, wherein the product contains about 3.8% calcium, 1.3% sodium, and 5 to 6% methoxyl.

The pectin which I specifically mentioned hereinabove as having a methoxyl content of from 9 to 11% is illustrative of a pectin of relatively high purity. Such a pectin is, however, readily obtainable in commerce. Other pectins are available for use. Pectins of higher methoxyl content that 11% have been prepared by careful manipulation, while pectins of lower methoxyl content than 9% are ordinarily the result of more drastic treatment during the extraction from their source material. Manifestly, any pectin having a methoxyl content higher than that desired as a minimum in the final product may suitably be subjected to the treatment described above. As indicated above, this methoxyl content may very suitably be about 5% to 6%. The above treatment will be preferred for those pectins having a methoxyl content above about 8% methoxyl. As indicated hereinbelow, when the methoxyl content is below about 8%, further demethoxylation is not necessary.

So far as I am aware, there is nothing particularly critical in the use of isopropyl alcohol or of the particular proportions indicated. It is necessary to have a suitable solvent in which the alkalizing agent employed for hydrolysis of the pectin is sufficiently soluble and a concentration of solvent such that substantial hydration of the pectin being treated is prevented. I have mentioned isopropyl alcohol in the example because I find it economically available in large quantities and it is thoroughly satisfactory for use. Ethyl alcohol or other solvents which meet the above requirements are satisfactory for use in the preparation of my product. Suitable precipitants for pectins, usually members of a class of compounds commonly called "solvents" are very well known in the art.

While sodium hydroxide has been chosen as the preferred alkalizing agent for effecting the hydrolysis of the pectin because of economy, availability, and completely satisfactory results, it is to be understood that any agent which will be soluble in the reagent mixture and which will produce sufficient alkalinity to promote the desired hydrolysis may be substituted. Potassium hydroxide and ammonium hydroxide are examples of other alkalizing agents which are satisfactory. It is to be borne in mind that the subsequent use of my product determines to a considerable extent the reagents which will be used in preparing the product.

I have suggested the use of calcium chloride as a source of calcium because this compound does not ordinarily interfere with or deleteriously affect the hydrolysis reaction. Furthermore, the calcium of this particular compound is readily available for combining with the pectin, when the methoxyl content of the pectin has been reduced to a point where a relatively insoluble compound with calcium will be formed. Other calcium compounds, such as calcium nitrate, are satisfactory. Also, I have further found that certain alcohol soluble salts of barium and strontium, as for example the chlorides, may be used in combination with sodium to produce satisfactorily insoluble pectinates.

It must be kept in mind throughout that, in the choice of reagents, due regard should be had for the intended use of the final compounds, particular attention being given at all times to the matter of possible toxicity.

The times of treatment and the temperatures indicated hereinabove are preferred but may be varied beyond the limits indicated in the example, if one keeps in mind the desirability and necessity of carrying forward the reactions on the one hand and of avoiding destructive effects upon the pectin molecule on the other hand.

As mentioned before, pectin has been used as a medicinal agent for some time. Possibly the first use, indirectly, was by the administration to infants and others of scraped apple. Subsequently, it was determined that the effective constituent of scraped apple was pectin and accordingly pectin in various forms has been proposed and used. Now a common practice is to administer pectin either alone or combined with other ingredients, used to mask and reduce the tendency of the pectin to gum.

Also attempts have been made to produce pills of pectin but such attempts to date have been unsatisfactory, since in order to prepare a pill containing an adequate amount of pectin the pill must be of such a size as to necessitate chewing. Chewing of pectin is extremely distasteful to the patient because the mucilaginous character of the pectin results in a disagreeable, slimy, gummy mass being formed in the mouth. Consequently these difficulties have restricted the use of pectin to a great extent, in spite of the fact that it is very valuable for certain usages.

Past efforts made to counteract the disagreeable effects of pectin when taken orally have not been completely satisfactory, most of which have involved the addition of inert foreign elements such as stearic acid and waxes.

By preparing a pectic compound in accordance with the above disclosures a product results in which the sticky nature of pectin is completely overcome. Furthermore, this is accomplished without in any degree lessening the efficiency of the pectic substance for the purpose for which it is to be used. Indeed, the presence of calcium is definitely of value as the pectinate is exposed to the action of intestinal bacteria acids, etc. My products do not tend to create slimy disagreeable masses when moistened with water or saliva where proper insolubility of the pectinate has been achieved in preparation. Thus my pectinates may be made into pills which can be chewed and swallowed without difficulty. Also they may be administered as powders dry or suspended in a liquid, such as water.

It is obvious that certain variations may be made where, for example, it may be desirable by my process to prepare instead of a mixed pectinate, as for example sodium calcium pectinate, a pectinate of suitable insolubility in which only calcium is added to the pectin molecule. This product may be prepared by first suspending the desired quantity of a pectin of sufficiently low methoxyl content in a liquid medium incapable of hydrating the pectin to any substantial degree and subsequently adding thereto adequate calcium in the form of an alcohol soluble compound such as calcium chloride. Pectins having a methoxyl content below about 8% —$OCH_3$ will respond to the above process for the preparation of the pectinates. While the pectinates which I have referred to hereinabove are insoluble in water due to their metal content, they are in the intestinal tract broken down into products which in the intestinal tract perform in all respects as pectin. Apparently the metals are removed from the metal pectinates by the hydrochloric acid of the stomach and the pectin is restored to its normal hydrophylic state. Apparently, the lower methoxyl content of the pectin so produced does not deleteriously affect the therapeutic properties.

Obviously the pectinates whenever desired may be used in combination or in admixture with other medicinal agents if and when desired.

This application is a division of my co-pending application Serial No. 482,827, filed April 12, 1943, which application was a continuation-in-part of my then co-pending application Serial No. 394,165, filed May 19, 1941.

Having thus described my invention in such clear and concise language as to enable others skilled in the art to use the same, I claim as my invention and desire to secure by Letters Patent the following:

1. A process for the preparation of an alkaline earth pectinate comprising suspending pectin having a methoxyl content below about 8% —$OCH_3$ in a liquid medium incapable of hydrating the pectin to any substantial degree but capable of dissolving an effective amount of an alkaline earth salt, adding to the suspension a water soluble, alcohol soluble alkaline earth salt in an amount sufficient to form a corresponding water insoluble pectinate, and separating said pectinate from the liquid medium.

2. A process for the preparation of a calcium pectinate comprising suspending pectin having a methoxyl content below about 8% —$OCH_3$ in a liquid medium incapable of hydrating the pectin to any substantial degree but capable of dissolving an effective amount of a calcium salt, adding to the suspension a water soluble, alcohol soluble calcium salt in an amount sufficient to form a water insoluble calcium pectinate and separating said pectinate from the liquid medium.

3. A process for the preparation of a calcium pectinate comprising suspending pectin having a methoxyl content below about 8% —$OCH_3$ in a liquid medium incapable of hydrating the pectin to any substantial degree but capable of dissolving an effective amount of calcium chloride, adding to the suspension calcium chloride in an amount sufficient to form a water insoluble calcium pectinate and separating said pectinate from the liquid medium.

4. A process for the preparation of a calcium pectinate comprising suspending pectin having a methoxyl content below about 8% —$OCH_3$ in isopropyl alcohol, adding to the suspension calcium chloride in an amount sufficient to form a water insoluble calcium pectinate and separating said pectinate from the liquid medium.

EDWIN F. BRYANT.